United States Patent Office 3,335,055
Patented Aug. 8, 1967

3,335,055
MORE STABLE AND MORE SOLUBLE TETRACYCLINE COMPOSITIONS SUITABLE FOR PARENTERAL USE AND METHOD OF PREPARING SAME
Joseph Francis Weidenheimer, New City, and Lawrence Ritter, Suffern, N.Y., and George Sieger, East Paterson, N.J., assignors to American Cyanamid Company, New York, N.Y., a corporation of Maine
No Drawing. Filed Aug. 30, 1961, Ser. No. 134,831
3 Claims. (Cl. 167—65)

This application is in part a continuation of our copending application Ser. No. 778,319, filed Dec. 5, 1958, now abandoned, which application, in turn, is in part a continuation of our copending application Ser. No. 594,089, filed June 27, 1956, now abandoned.

This invention relates to a more soluble and more stable antibiotic composition. More particularly, this invention relates to more soluble and more stable tetracycline antibiotic compositions.

It is known that the various tetracycline antibiotics are generally not very soluble at their isoelectric point. As the pH approaches the isoelectric point, the solubility of the tetracycline antibiotics approaches a minimum. It is also known that as the pH is increased from an acid pH, the activity stability decreases. Moreover, the known pharmaceutical compositions of these antibiotics occur within this pH range, whether they be compositions meant for oral or parenteral use. With these known compositions, if one raises the pH is an endeavor to reach the normal tissue pH, the antibiotic will become less stable and less soluble.

It has been found that both the solubility and stability of the tetracycline antibiotics can be increased by the addition of water-soluble magnesium compounds capable of ionization and in which the anion is physiologically acceptable, and certain pyridine derivatives of the following formula:

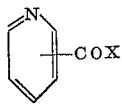

wherein

X is 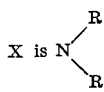

or OR' where R is H, lower alkyl or lower alkanol and R' is a non-toxic cation preferably magnesium or lower alkyl. By lower alkyl or alkanol is meant 1–4 carbon atoms.

It should be noted that all of the pyridine derivatives contemplated by the present invention are non-toxic and physiologically acceptable. Toxic pyridine compounds, such as pyridine itself or aminopyridine, do not have the desired effect and cannot be used as they constitute poisons.

Typical pyridine derivatives falling under the above group are nicotinamide, isonicotinamide, picolinamide, N-methyl nicotinamide, N-ethanol nicotinamide, methyl nicotinate, methyl isonicotinate, nicotinic acid, sodium nicotinate, magnesium nicotinate, ethyl nicotinate, ethyl isonicotinate, N,N-dialkyl nicotinamide and isonicotinamide, etc. Obviously, of course, the composition may contain a mixture of more than one pyridine derivative in combination with the tetracycline antibiotic and the magnesium ion.

Generally, any soluble magnesium salt of a physiologically acceptable anion can be used in the instant invention, for example, the soluble magnesium salts such as the chloride, sulfate, citrate, ascorbate, gluconate, lactate, etc.

Any of the various known tetracycline antibiotics can be used, for example, the free-base of tetracycline, the acid salts and similar derivatives of chlortetracycline, oxytetracycline, bromtetracycline, 7-chloro-6-demethyltetracycline, 6-demethyltetracycline and 6-demethyl-6-deoxytetracycline.

The composition of this invention is essentially a three-component system, the tetracycline antibiotic, the pyridine derivative and the magnesium ion. This composition will, of course, find use wherever it is desirable to have a stable, soluble tetracycline antibiotic composition. It is particularly useful for parenteral administration; specifically, it is used most advantageously intramuscularly. This three-component composition may be used, for example, intramuscularly by itself; preferably, it is used in combination with hydroxy acid ions, which are known to enhance blood levels of tetracycline antibiotics when injected intramuscularly. The hydroxy acid ions may be present as acids or salts and may be combined with the magnesium ion or with a part thereof. For example, a composition comprising tetracycline hydrochloride, nicotinamide, magnesium ascorbate and magnesium nicotinate may be used. The ions of any soluble solid, non-toxic hydroxy acid may be used; for example, those listed above in conjunction with the magnesium ion. Moreover, a non-toxic solid local anesthetic or analgesic may be added to the composition of this invention; examples of the former are procaine and its derivatives, the latter, antipyrine. Of course, conventional stabilizers, such as sodium sulfite, etc. may be added in small amounts.

The present invention makes it possible to prepare a parenterally administerable form of a tetracycline antibiotic at pH levels close to those commonly found in body tissues. A remarkable stability is obtained in comparison to known tetracycline intramuscular preparations. The composition of the present invention gives a pH of 3.8 to 4.0 upon reconstitution with water and may be adjusted to 6.0 and over upon the addition of a suitable alkalizing agent; this latter composition retains 87% of label strength after 7 days storage at room temperature. Moreover, the composition of the present invention has a remarkable solubility. Thus, a mixture of magnesium chloride, nicotinamide and tetracycline hydrochloride at pH 5.5 has a solubility of approximately 50 to 100 mgs./ml. The solubility of tetracycline hydrochloride alone at this point (i.e. the isoelectric point) is 400 mcgs./ml. and tetracycline hydrochloride in the presence of magnesium chloride alone less than 1 mg./ml. On the other hand, a composition of tetracycline hydrochloride, magnesium chloride hexahydrate, and procaine hydrochloride having an original pH of about 2.0, precipitates out in the form of a heavy gelatinous precipitate when the pH is adjusted to 4.0 with 10% sodium hydroxide. With nicotinamide added to this same composition, the pH can be raised to above 6.0 before any precipitation takes place.

The proportional amounts of the various components of the present invention may vary over a wide range. A ratio of 1 mol of the tetracycline antibiotic to 4 mols of the pyridine derivative to 1 mol of the magnesium ion has been found to be a practical lower limit. As long as the concentration of the tetracycline antibiotic remains constant, the concentrations of the magnesium ion and the pyridine derivative can be varied in any proportion upward; dropping the concentration of either or both of the latter two proportionately decreases the desirable solubility effect. Thus, if one decreases the amount of magnesium ion to ½ mol and maintains the amount of the tetracycline antibiotic constant, one would have to increase the amount of the pyridine derivative to about 40 mols in order to achieve the same solubility effect as with the 1:4:1 ratio referred to above. A preferred composition is one consisting of from 1–6 moles of water-soluble magnesium salt and from 3–16 moles of pyridine derivative for each mole of tetracycline antibiotic. The preferred proportions of the preferred components of this composition are in the range of about 1 mol of tetracycline hydrochloride to about 8 mols of nicotinamide to about 2.50 mols of magnesium chloride hexahydrate to about 3.5 to 7.0 mols of an alpha hydroxy acid.

From the foregoing observations, it can be postulated that the combination of the tetracycline antibiotic, the pyridine derivative and the magnesium ion form a complex. This postulate is supported further by the fact that because of the weak alkaline nature of the various pyridine derivatives involved in this invention, these pyridine derivatives are incapable of forming salts with tetracycline antibiotics. The increased solubility at these elevated pH levels provides further evidence that a complex of the tetracycline antibiotic, the magnesium ion, and the pyridine derivative does exist.

The following examples are provided for illustrative purposes and may include particular features of the invention. However the examples should not be construed as limiting the invention, many variations of which are possible without departing from the spirit or scope thereof. Where amounts are stated by percent, they are in terms of weight of ingredient per volume of solution unless indicated otherwise.

*Example 1*

A composition having the following formulation was made up:

| | Grams |
|---|---|
| Nicotinamide | 10.0 |
| Magnesium chloride·6H$_2$O | 5.0 |
| Tetracycline HCl | 5.0 |
| Procaine HCl | 2.0 |
| Sodium sulfite | 0.100 |

Ingredients are added in the above order to sufficient water to produce a 100 milliliter solution having a pH of 3.9. This solution is divided into 7 aliquots and the pH then adjusted to 4.0, 4.5, 5.0, 5.5, 6.0 and 6.9. All of the aliquots remained clear for more than 7 days at both room temperature and 4° C. Without sodium sulfite a rapid discoloration takes place in the aliquots with a pH greater than 5.

In a 5% solution of nicotinamide (instead of 10% as above), the antibiotic precipitated out above pH 5.5; after 3 days at room temperature, the pH 5.0 sample also precipitated.

If the order of the addition of ingredients is such that the tetracycline hydrochloride is added to the nicotinamide solution before the magnesium chloride, a heavy precipitate of tetracycline base forms at once. If the magnesium chloride is added at this point the crystalline base will not redissolve unless stirring is continued for 12–24 hours. However, if all the ingredients are dissolved simultaneously as from a dry mix, a clear solution is obtained almost immediately.

*Example 2*

The procedure of Example 1 was repeated omitting the nicotinamide:

| | Grams |
|---|---|
| Tetracycline HCl | 5 |
| MgCl$_2$·6H$_2$O | 5 |
| Procaine HCl | 2 |

When the pH of the above solution was adjusted from its original value of 2.0 to 4.0 with 10% sodium hydroxide solution, a heavy gelatinous precipitate formed.

*Example 3*

A 100 milliliter aqueous solution of a tetracycline intramuscular formulation was prepared containing:

| | Grams |
|---|---|
| Tetracycline HCl | 5 |
| Ascorbic acid | 12.5 |
| MgCl$_2$·6H$_2$O | 5 |
| Procaine HCl | 2 |

The initial pH of the above solution was 1.8. When 20% sodium hydroxide was added to the solution, it remained clear up to pH 4.0; above this pH, precipitation takes place. In the presence of 25% nicotinamide no precipitation takes place below pH 5.5.

*Example 4*

Solutions containing 5 grams tetracycline hydrochloride, 5 grams MgCl$_2$·6H$_2$O, 10 grams nicotinamide and 2 grams procaine hydrochloride were made up to 100 milliliters with water adjusted to various pH levels and assayed microbiologically at intervals up to 16 days at both room temperature and chill room temperature.

As a control, a composition containing the same amounts of the above components, except the nicotinamide, plus 12.5 grams ascorbic acid was prepared, two of these latter samples being adjusted to pH 3.0 and pH 4.0 to see if any stabilization would take place by making the product less acidic. Results of these tests appear in the following table.

TABLE 1

| | Theory, mg./ml. | Initial, mg./ml. | Percent Loss of Activity From Theory | | | | | | | | | | | | | |
|---|---|---|---|---|---|---|---|---|---|---|---|---|---|---|---|---|
| | | | 2 Days | | 3 Days | | 4 Days | | 5 Days | | 7 Days | | 9 Days | | 16 Days | |
| | | | RT | CR | RT | CR | RT | CR | RT | CR | RT | CR | RT | CR | RT | CR |
| Nicotinamide Solutions, pH: | | | | | | | | | | | | | | | | |
| 4.0 | 55 | 56.3 | | | 25 | 1 | | | 23 | 11 | 29 | 16 | 38 | 16 | 52 | 36 |
| 5.0 | 50 | 52.4 | 0 | 0 | | | 16 | 12 | | | 13 | 18 | | | | |
| 6.0 | 50 | 51.4 | 2 | 0 | | | 20 | 9 | | | 33 | 15 | | | | |
| 2.7 | 50 | 52.4 | 12 | 0 | | | 29 | 0 | | | | | | | | |
| 3.0 | 50 | 53.0 | 13 | 0 | | | 25 | 0 | | | | | | | | |
| 3.75 | 50 | 48.6 | | | | | 40 | 15 | | | | | | | | |
| 3.5 | 50 | 49.2 | | | | | 23 | 15 | | | | | | | | |
| Control, pH: | | | | | | | | | | | | | | | | |
| 1.8 | 50 | 41.2 | 36 | 18 | | | 46 | 22 | | | 54 | 25 | | | | |
| 3.0 | 50 | 40.5 | 40 | 26 | | | 40 | | | | 56 | | | | | |
| 4.0 | 50 | 40.4 | 32 | 22 | | | 42 | | | | 41 | | | | | |

RT—Room Temperature. CR—Chill Room Temperature.

It is evident from the above table that a marked stabilization takes place with the solutions containing nicotinamide. This effect is more pronounced above pH 4.0 with the room temperature samples, although the chill room results appear to be essentially the same between pH 2.7 and 6.0. With the control, there is no difference between the pH 1.8, 3.0 and 4.0 samples.

*Example 5*

The following components were added in the order shown below and made up to volume in the same manner as in Example 1 giving a clear solution having a pH of 4.4.

| | Grams |
|---|---|
| Tetracycline HCl | 5 |
| Procaine HCl | 2 |
| Magnesium ascorbate | 9.2 |
| Nicotinamide | 10 |
| Ascorbic acid | 0.5 |

Aliquots of the above solution were adjusted to various pH levels with 20% sodium hydroxide and adjusted to a final tetracycline concentration of 50 mg./ml. with distilled water. The formulations remained clear up to pH 7.0. These were divided in half; one set was placed in a chill room (0–5° C.), and the other set maintained at room temperature. After a two week period, all aliquots were still clear; the set at room temperature had darkened.

*Example 6*

The procedure of Example 5 was repeated as follows:

| | Grams |
|---|---|
| Tetracycline HCl | 5 |
| Procaine HCl | 2 |
| Nicotinamide | 10 |
| Magnesium nicotinate | 6.6 |

Aliquots were adjusted to various pH levels up to pH 7.0 in the same manner as above; the initial pH was 4.8. All aliquots were clear and remained clear for two weeks except for the pH 7.0 aliquots which remained clear for 3 days. Darkening appeared in both the refrigerated and non-refrigerated aliquots at two weeks.

*Example 7*

The procedure of Example 5 was repeated as follows:

| | Grams |
|---|---|
| Tetracycline HCl | 5 |
| Procaine HCl | 2 |
| Magnesium citrate | 7.7 |
| Nicotinamide | 10 |

Aliquots were adjusted to various pH levels with 20% sodium hydroxide as above; the initial pH was 4. Aliquots were clear up to pH 6.0; after three days, all below pH 6.0 were still clear.

*Example 8*

The procedure of Example 5 was repeated as follows:

| | Grams |
|---|---|
| Tetracycline HCl | 5 |
| Procaine HCl | 2 |
| Nicotinamide | 10 |
| Magnesium gluconate | 10.2 |

Aliquots were adjusted to various pH levels up to pH 7.0 with 20% sodium hydroxide as above; the initial pH was 4.1. All aliquots remained clear for three days. After five days, a slight precipitation appeared in the pH 7.0 aliquots. After two weeks, all were clear up to pH 7.0. Those at room temperature and in the chill room darkened.

*Example 9*

The procedure of Example 5 was repeated as follows:

| | | |
|---|---|---|
| Isonicotinamide | grams | 10 |
| MgCl$_2$·6H$_2$O | do | 5 |
| Tetracycline HCl | do | 5 |
| Procaine HCl | do | 2 |
| Sodium sulfite | milligrams | 100 |

The clear yellow solution which results had a pH of 4.4; the instantaneous formation of a clear yellow solution is strong evidence of complex formation. It was divided into 5 equal aliquots and each was adjusted to the following pH levels with 20% aqueous sodium hydroxide as above: 5.5, 6.5, 7.0, and 7.2. These remained clear up to pH 7.0. These aliquots were again divided into two equal parts. One set was kept at room temperature and a second set was placed in a chill room (0.5° C.), and allowed to stand overnight (about 16 hours). The set under refrigeration remained clear up to pH 7.0, but the set at room temperature showed slight precipitation at pH 5.5.

*Example 10*

The procedure of Example 5 was repeated as follows:

| | | |
|---|---|---|
| N-methyl nicotinamide | grams | 10 |
| MgCl$_2$·6H$_2$O | do | 5 |
| Tetracycline HCl | do | 5 |
| Procaine HCl | do | 2 |
| Sodium sulfite | milligrams | 100 |

A clear yellow solution formed with a pH of 3.8. It was divided into 5 equal aliquots, each was adjusted at various pH levels up to 7.0 and made up to 20 milliliters. Each aliquot was divided into two equal parts; one set was placed in the chill room, and the other left at room temperature. The set at room temperature showed a precipitate at pH 6 after standing one hour. After 24 hours, the set in the chill room showed some precipitate at pH 6.

*Example 11*

The procedure of Example 5 was repeated as follows:

| | Grams |
|---|---|
| Picolinamide | 5 |
| MgCl$_2$·6H$_2$O | 5 |
| Tetracycline HCl | 5 |
| Procaine HCl | 2 |

This solution was divided into five equal aliquots and adjusted to various pH levels with dilute aqueous sodium hydroxide as above; the initial pH was 2.8. Clear solutions are produced up to pH 5.5.

*Example 12*

The procedure of Example 5 was repeated as follows:

| | | |
|---|---|---|
| Methyl nicotinate | grams | 10 |
| MgCl$_2$·6H$_2$O | do | 5 |
| Tetracycline HCl | do | 2 |
| Procaine HCl | do | 2 |
| Sodium sulfite | milligrams | 100 |

A clear solution having a pH of 3.6 is produced. This solution was divided into 5 aliquots and each adjusted to various pH levels as above to 20 cc. It was found that a clear solution remained up to pH 6.0. pH 6.0 gives a clear solution at first, but precipitation results after a 2 hour period.

*Example 13*

The procedure of Example 5 was repeated as follows:

| | | |
|---|---|---|
| Methyl isonicotinate | grams | 10 |
| MgCl$_2$·6H$_2$O | do | 5 |
| Tetracycline HCl | do | 5 |
| Procaine HCl | do | 2 |
| Na$_2$SO$_3$ | milligrams | 100 |

The initial pH of the clear solution was 4.0; it was divided into 5 equal aliquots, each adjusted to various pH's as above. A clear solution persisted up to pH 6.5.

*Example 14*

The procedure of Example 5 was repeated as follows:

| | | |
|---|---|---|
| Mg nicotinate | grams | 10 |
| MgCl$_2$·6H$_2$O | do | 5 |
| Tetracycline HCl | do | 5 |
| Procaine HCl | do | 2 |
| Sodium sulfite | milligrams | 100 |

The resulting solution was divided into two portions, each having a pH of 5.0. There was no precipitation for 2 hours. One portion was adjusted to pH 6.0 with dilute NaOH; precipitation occurred very shortly. When the above experiment was repeated using 5% solution of Mg nicotinate in place of the 10% solution, similar results were obtained.

*Example 15*

The procedure of Example 5 was repeated as follows:

| | Grams |
|---|---|
| N-ethanol nicotinamide | 10 |
| Magnesium chloride·6H₂O | 5 |
| Tetracycline HCl | 2 |
| Sodium sulfite | 0.1 |

This solution was divided into 5 equal aliquots and each aliquot was adjusted to various pH levels with dilute aqueous sodium hydroxide as above; the initial pH was 4.0. Clear solutions are produced up to pH 5.0.

*Example 16*

The procedure of Example 5 was repeated as follows:

| | Grams |
|---|---|
| Nicotinamide | 5 |
| Antipyrine | 5 |
| Tetracycline HCl | 5 |
| Magnesium chloride·6H₂O | 5 |
| Sodium sulfite | 0.1 |

This solution was divided into 5 equal aliquots and adjusted to various pH levels with dilute sodium hydroxide as above. Each of these aliquots was divided into two parts; one set of each being stored at room temperature and the other at chill room temperature. All aliquots in both sets produced clear light yellow solutions at pH 7.0 and below. After one week, both sets had darkened to produce a yellow-orange clear solution at pH 5.0 and below. Both sets at pH 6.0 and 7.0 were of a darker color and contained a very slight haze.

*Example 17*

The procedure of Example 5 was repeated as follows:

| | Grams |
|---|---|
| Tetracycline HCl | 5 |
| Magnesium chloride hexahydrate | 5 |
| Nicotinamide | 10 |
| Citric acid (anhydrous) | 10 |
| Procaine HCl | 2 |

This solution was divided into aliquots and each aliquot was adjusted to various pH levels with dilute aqueous sodium hydroxide as above; the initial pH was 2.7. Clear solutions are produced up to pH 5.0.

*Example 18*

The following components were added in the order shown and made up to a volume of 10 milliliters.

| | |
|---|---|
| Ethyl nicotinate | gram 1 |
| MgCl₂·6H₂O | milligrams 500 |
| Tetracycline HCl | do 200 |
| Procaine HCl | do 80 |

The pH (4.0) of the above solution was adjusted with 10% HCl and became clear at about pH 3.5.

*Example 19*

The procedure of Example 18 was repeated as follows:

| | |
|---|---|
| N,N-diethyl nicotinamide | gram 1 |
| MgCl₂·6H₂O | milligrams 500 |
| Tetracycline HCl | do 500 |
| Procaine HCl | do 200 |

The above solution was adjusted with 10% NaOH and became clear at a pH of about 4.05. This solution was physically stable in a pH range of approximately 4 to 5.

*Example 20*

The following components were mixed together:

| | Milligrams |
|---|---|
| 7-chloro-6-demethyl-tetracycline HCl | 110 |
| Mg gluconate | 330 |
| Nicotinamide | 100 |
| Citric acid | 50 |
| Xylocaine base | 33 |

The mixed components were then dissolved in 1.8 milliliters of water. The pH was between 3.3 and 4.0 and a clear solution was formed.

We claim:
1. A composition of matter comprising a tetracycline antibiotic, a water-soluble magnesium salt of a physiologically acceptable anion and isonicotinamide.
2. A composition of matter comprising a tetracycline antibiotic, a water-soluble magnesium salt of a physiologically acceptable anion and picolinamide.
3. A composition of matter comprising a tetracycline antibiotic and magnesium nicotinate.

References Cited

UNITED STATES PATENTS

| | | | |
|---|---|---|---|
| 2,482,055 | 9/1949 | Duggar | 260—559 |
| 2,671,806 | 3/1954 | Winterbottom et al. | 260—559 |
| 2,734,018 | 2/1956 | Minieri et al. | 260—559 |
| 2,763,682 | 9/1956 | Winterbottom et al. | 260—559 |
| 2,803,657 | 8/1957 | Ritter | 260—559 |
| 2,878,289 | 3/1959 | McCormick et al. | 167—65 |
| 2,886,595 | 5/1959 | Heinemann et al. | 260—559 |
| 2,980,584 | 4/1961 | Hammer | 167—65 |
| 2,990,331 | 6/1961 | Neumann et al. | 167—65 |
| 3,128,227 | 4/1964 | Kanegis et al. | 167—65 |
| 3,232,834 | 2/1966 | Gordon et al. | 167—65 |

FOREIGN PATENTS

| | | |
|---|---|---|
| 200,826 | 2/1956 | Australia. |
| 506,950 | 11/1951 | Belgian. |
| 536,274 | 3/1955 | Belgian. |

OTHER REFERENCES

Modern Drugs, March 1955, pp. 137–138.
Van Dyck et al.: Antibiotics and Chemotherapy, vol. 2, pp. 184, 192–4 (1952).

LEWIS GOTTS, *Primary Examiner.*

JULIAN S. LEVITT, FRANK CACCIAPAGLIA, JR., ELBERT L. ROBERTS, *Examiners.*

S. K. ROSE, *Assistant Examiner.*